(12) United States Patent
Chang et al.

(10) Patent No.: US 6,649,554 B1
(45) Date of Patent: Nov. 18, 2003

(54) DIELECTRIC COMPOSITION HAVING INCREASED HOMOGENEITY AND INSULATION RESISTANCE, METHOD OF PREPARING THE SAME AND MULTI-LAYER CERAMIC CAPACITOR USING THE SAME

(75) Inventors: Dong Gyu Chang, Suwon (KR); Kang Heon Hur, Suwon (KR); Hee Young Son, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/320,682

(22) Filed: Dec. 17, 2002

(30) Foreign Application Priority Data

May 24, 2002 (KR) .......................... 2002-28881

(51) Int. Cl.⁷ .......................... C04B 35/468; H01G 4/12
(52) U.S. Cl. .................. 501/137; 501/138; 501/139; 361/321.4; 361/321.5
(58) Field of Search ................ 501/137, 138, 501/139; 361/321.4, 321.5

(56) References Cited

U.S. PATENT DOCUMENTS 5,219,812 A * 6/1993 Doi et al. .................. 501/138
6,385,035 B1 * 5/2002 Matoba et al. ........... 361/321.1
6,437,970 B1 * 8/2002 Lee et al. .................. 361/311
6,556,423 B2 * 4/2003 Konaka et al. .......... 361/321.2

FOREIGN PATENT DOCUMENTS

JP  2000-243652  9/2000

\* cited by examiner

*Primary Examiner*—Karl Group
(74) *Attorney, Agent, or Firm*—Lowe Hauptman Gilman & Berner LLP

(57) ABSTRACT

Disclosed is a dielectric composition, which is advantageous in light of increased homogeneity and insulation resistance, a method of preparing the same and a multi-layer ceramic capacitor using the same. The dielectric composition consists of a dielectric component represented by $(Ba_{1-x-y}Ca_xA_y)_m(Ti_{1-a-b-c}Zr_aB'_bB''_c)O_{3+m}$, (wherein, $0.01 \leq x \leq 0.10$, $0.003 \leq y \leq 0.015$, $0.16 \leq a \leq 0.20$, $0.003 \leq b \leq 0.015$, $0 \leq c \leq 0.015$, $1.000 \leq m \leq 1.010$; the component A is selected from among Y oxides, La oxides, Ho oxides, Dy oxides, Er oxides, Hf oxides and combinations thereof; the component B' is selected from among Mn oxides, Co oxides, Ni oxides and combinations thereof; and the component B'' is selected from among V oxides, Nb oxides, Ta oxides and combinations thereof), and a sintering aid represented by $zLi_2O-2(1-z)SiO_2 (0 \leq Z \leq 0.9)$.

9 Claims, 3 Drawing Sheets

DIELECTRIC COMPOSITION HAVING INCREASED HOMOGENEITY AND INSULATION RESISTANCE, METHOD OF PREPARING THE SAME AND MULTI-LAYER CERAMIC CAPACITOR USING THE SAME

BACKGROUND OF THE INVENTION

1. Field of the Invention

The present invention pertains, in general, to dielectric compositions, and in particular, to a dielectric composition having increased homogeneity and insulation resistance, comprising a main ingredient and a supplementary ingredient calcined while controlling their particle size in combination with a separately added sintering aid; a method of preparing the same and a multi-layer ceramic capacitor using the same.

2. Description of the Prior Art

Generally, as high dielectric constant materials showing Y5V temperature property, use has been made of a mixture of $(Ba_{1-x}Ca_x)_m(Ti_{1-y}Zr_y)O_{3+m}$ prepared by synthesizing $BaCO_3$, $CaCO_3$, $TiO_2$ and $ZrO_2$ as a principal ingredient through solid phase reaction, and various additives as a supplementary ingredient for improving electrical properties.

In this regard, the main ingredient powder composed of barium titanate ($BaTiO_3$), barium zirconate ($BaZrO_3$), calcium titanate ($CaTiO_3$) and calcium zirconate ($CaZrO_3$) sintered together with various auxiliary ingredient powders is used as a dielectric layer in a multi-layer ceramic capacitor with an internal Ni electrode meeting Y5V property. As for additives, used are manganese oxides, acting as an acceptor for providing resistance to reduction by oxygen vacancy formed previously within a master material, at least one selected from among compounds of rare-earth elements, such as $Y_2O_3$, $Ho_2O_3$, $Er_2O_3$, $Dy_2O_3$ and $V_2O_5$, acting as a donor for supplementing electric charges used for facilitated deterioration of insulation resistance by thusly formed oxygen vacancy, and a sintering aid of a glass component.

The main ingredient $(Ba_{1-x}Ca_x)_m(Ti_{1-y}Zr_y)O_{3+m}$ powder, which is prepared by solid phase synthesis, can be regulated in its particle size by controlling temperature and reaction time of a thermal treatment, and thus is advantageous in light of relatively simple preparation process and low preparation cost.

However, since a certain additive is simply added to $(Ba_{1-x}Ca_x)_m(Ti_{1-y}Zr_y)O_{3+m}$ in a batch process, homogeneity of the mixture comprising the main ingredient and the supplementary ingredient is reduced, and thus a microstructure of the dielectric composition becomes nonhomogeneous.

When $(Ba_{1-x}Ca_x)_m(Ti_{1-y}Zr_y)O_{3+m}$ is not uniformly mixed with the additive and is locally segregated, such segregation adversely affects particle growth and thus a nonhomogeneous microstructure distribution is obtained.

Such nonhomogeneity causes variation of electrical properties as well as severe problems related to reliability.

As for mixing of the additive, it is thus important that $(Ba_{1-x}Ca_x)_m(Ti_{1-y}Zr_y)O_{3+m}$ is uniformly mixed with the additive.

Particularly, according to recent tendency toward miniaturization and thinness of multi-layer ceramic capacitors, the dielectric layer becomes thin, whereby a uniform mix of $(Ba_{1-x}Ca_x)_m(Ti_{1-y}Zr_y)O_{3+m}$ and the additive is a chief process variable for preparation of such capacitors having high capacities.

Typically, in the case of merely adding previously calcined main ingredient powders with and a small amount of an additive in a batch process, the extent of dispersion cannot be controlled. As such, the additive is responsible for controlling electrical properties, such as provision of resistance to reduction, deterioration prevention of insulation resistance and improved reliability in the multi-layer ceramic capacitor. Upon application of such a dielectric composition to the ceramic capacitor having high capacity, nonhomogeneous microstructure results in irregular voltage resistance and poor reliability.

In order to solve such problems, there have been proposed mixing methods over long periods of time to improve dispersibility of raw material powders. But such methods suffer from disadvantages of increased process cost due to long treatment time, and adulteration by impurities.

Japanese Laid-open Pat. No. 2000-243652 discloses a dielectric composition prepared by simultaneously calcining a main ingredient, a supplementary ingredient and a sintering aid. However, the above patent has the drawback of large particle size in the dielectric composition bonded strongly by the sintering aid.

Further, since conventional dielectric compositions are fired at high temperatures of 1200° C. or more, a problem of electrode break due to high temperature firing is caused even though a high dielectric constant is realized. Additionally, the size of crystal particles in the dielectric composition is increased, and thus there is a technical limitation to apply such a composition to a superthin type multi-layer ceramic capacitor.

SUMMARY OF THE INVENTION

Therefore, it is an object of the present invention to alleviate the problems in the prior art and to provide a low temperature firable dielectric composition, which is advantageous in light of increased homogeneity, dielectric constant and insulation resistance (specific resistivity).

It is another object of the present invention to provide a method of preparing such a dielectric composition.

It is a further object of the present invention a multi-layer ceramic capacitor using such a dielectric composition.

DETAILED DESCRIPTION OF THE INVENTION

Figure 1:
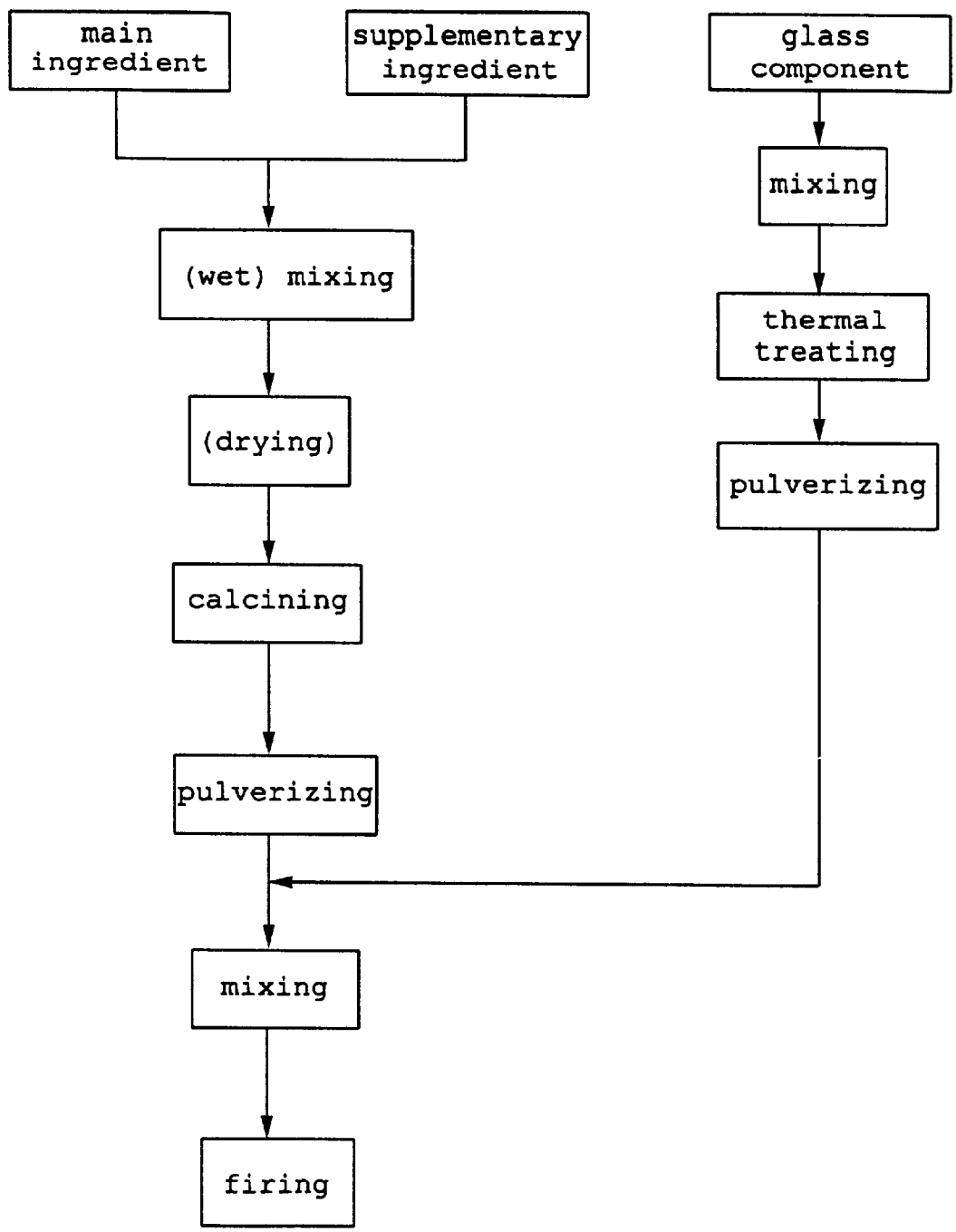
FIG. 1 is a schematic block diagram showing a preparation method of a dielectric composition, according to the present invention.

The present invention provides a dielectric composition comprising a dielectric component represented by the following chemical formula 1 and a sintering aid represented by the following chemical formula 2:

$$(Ba_{1-x-y}Ca_xA_y)_m(Ti_{1-a-b-c}Zr_aB'_bB''_c)O_{3+m} \quad \text{Chemical Formula 1}$$

wherein $0.01 \leq x \leq 0.10$, $0.003 \leq y \leq 0.015$, $0.16 \leq a \leq 0.20$, $0.003 \leq b \leq 0.015$, $0 \leq c \leq 0.015$, $1.000 \leq m \leq 1.010$; the component A is selected from the group-consisting of Y oxides, La oxides, Ho oxides, Dy oxides, Er oxides, Hf oxides and combinations thereof; the component B' is selected from the group consisting of Mn oxides, Co oxides, Ni oxides and combinations thereof; and the component B" is selected from the group consisting of V oxides, Nb oxides, Ta oxides and combinations thereof;

$$zLi_2O-2(1-z)SiO_2 (0 \leq z \leq 0.9).\quad\text{Chemical Formula 2}$$

Further, the present invention provides a method of preparing a dielectric composition, comprising the steps of: calcining a main ingredient composed of barium-, calcium-, titanium- and zirconia-supplying compounds, along with a supplementary ingredient consisting of one member selected from among Y oxides, La oxides, Ho oxides, Dy oxides, Er oxides, Hf oxides and combinations thereof, another member selected from among Mn oxides, Co oxides, Ni oxides and combinations thereof and a further member selected from among V oxides, Nb oxides, Ta oxides and combinations thereof, to prepare a dielectric component represented by the following chemical formula 1; mixing the calcined dielectric component of the chemical formula 1 with a sintering aid represented by the following chemical formula 2; and firing the mixed dielectric component and sintering aid:

$$(Ba_{1-x-y}Ca_xA_y)_m(Ti_{1-a-b-c}Zr_aB'_bB''_c)O_{3+m}\quad\text{Chemical Formula 1}$$

wherein $0.01 \leq x \leq 0.10$, $0.003 \leq y \leq 0.015$, $0.16 \leq a \leq 0.20$, $0.003 \leq b \leq 0.015$, $0 \leq c \leq 0.015$, $1.000 \leq m \leq 1.010$; the component A is selected from the group consisting of Y oxides, La oxides, Ho oxides, Dy oxides, Er oxides, Hf oxides and combinations thereof; the component B' is selected from the group consisting of Mn oxides, Co oxides, Ni oxides and combinations thereof; and the component B" is selected from the group consisting of V oxides, Nb oxides, Ta oxides and combinations thereof;

$$zLi_2O-2(1-z)SiO_2 (0 \leq z \leq 0.9).\quad\text{Chemical Formula 2}$$

Furthermore, the present invention provides a multi-layer ceramic capacitor having a ceramic layer comprising the dielectric composition and an internal electrode layer formed with nickel.

Below, a description will be given of a dielectric composition of the present invention.

The present invention is characterized in that increase of capacity dispersion and decrease of insulation resistance in end products, attributable to nonhomogeneously mixed phase of the main ingredient, the supplementary ingredient and the sintering aid, referred to as segregation, can be prevented, and also a firing process can be performed at a low temperature for application of the dielectric composition to a final product, thus preventing electrode break while yielding economic benefit and product reliability.

The present dielectric composition, which is homogeneous and improved in dielectric constant and insulation resistance (specific resistivity), is used as an insulating layer of the multi-layer ceramic capacitor.

The dielectric composition of the present invention consists of the dielectric component represented by the following chemical formula 1 and the sintering aid:

$$(Ba_{1-x-y}Ca_xA_y)_m(Ti_{1-a-b-c}Zr_aB'_bB''_c)O_{3+m}\quad\text{Chemical Formula 1}$$

wherein $0.01 \leq x \leq 0.10.$, $0.003 \leq y \leq 0.015$, $0.16 \leq a \leq 0.20$, $0.003 \leq b \leq 0.015$, $0 \leq c \leq 0.015$, $1.000 \leq m \leq 1.010$; the component A is selected from the group consisting of Y oxides, La oxides, Ho oxides, Dy oxides, Er oxides, Hf oxides and combinations thereof; the component B' is selected from the group consisting of Mn oxides, Co oxides, Ni oxides and combinations thereof; and the component B" is selected from the group consisting of V oxides, Nb oxides, Ta oxides and combinations thereof.

The values of x, y, a, b, c and m are selected, in consideration of firing and dielectric properties.

In the dielectric component of the chemical formula 1, the main ingredient is mixed at a single step, together with the supplementary ingredient, and calcined to form a uniform single phase having the supplementary ingredient substituted at a main ingredient position.

Additionally, such dielectric component of the chemical formula 1 is prepared by calcining oxides of Ba, Ca, Ti and Zr as the main ingredient powder and the supplementary ingredient substituted at the A-, the B'- and the B"-component positions in the chemical formula 1, considering their particle size.

By preparation of the dielectric component, substitution of the supplementary ingredient for the main ingredient is easily performed, and such component has uniform composition and is increased in insulation resistance (specific resistivity).

Hereinafter, a method of preparing a dielectric composition according to the present invention is described.

As can be seen in FIG. 1, the main ingredient and the supplementary ingredient should be mixed to meet the condition of the following chemical formula 1, yielding the dielectric composition of the present invention:

$$(Ba_{1-x-y}Ca_xA_y)_m(Ti_{1-a-b-c}Zr_aB'_bB''_c)O_{3+m}\quad\text{Chemical Formula 1}$$

wherein a molar fraction (x) of Ca ranges from 0.01 to 0.10, a molar-fraction (y) of A ranges from 0.003 to 0.015, a molar fraction (a) of Zr ranges from 0.16 to 0.20, a molar fraction (b) of B' ranges from 0.003 to 0.015, a molar fraction (c) of B" ranges from 0 to 0.015, and m ranges from 1.000 to 1.010.

After the main ingredient is mixed with the supplementary ingredient, they are dried, calcined and pulverized, thereby obtaining the dielectric component.

Such main ingredient is composed of barium-, calcium-, titanium- and zirconia-supplying compounds, which are not limited in the present invention, and any one commonly employed in the art can be used.

In this regard, the main ingredient is exemplified by barium carbonate, calcium carbonate, zirconium oxide, titanium oxide, barium titanate, barium zirconate, calcium titanate and calcium zirconate. When barium carbonate, calcium carbonate, zirconium oxide, and titanium oxide are used as the main ingredient, they react as represented by the following reaction formula 1, to form $(Ba_{1-x}Ca_x)(Ti_{1-y}Zr_y)O_3$:

$$(1-x)BaCO_3 + xCaCO_3 + (1-y)TiO_2 + yZrO_2 \rightarrow (Ba_{1-x}Ca_x)(Ti_{1-y}Zr_y)O_3 + CO_2\quad\text{Reaction Formula 1}$$

Substituted at the A- and the B-component positions (B' and B") in the chemical formula 1, the supplementary ingredient consists of one member selected from among Y oxides, La oxides, Ho oxides, Dy oxides, Er oxides, Hf oxides and combinations thereof, another member selected from among Mn oxides, Co oxides, Ni oxides and combinations thereof, and a further member selected from among V oxides, Nb oxides, Ta oxides and combinations thereof.

One selected from among Y oxides, La oxides, Ho oxides, Dy oxides, Er oxides, Hf oxides and combinations thereof, is displaced at the A-component position, and one selected from among Mn oxides, Co oxides, Ni oxides and combinations thereof, is substituted at the B'-component position. In addition, one selected from among V oxides, Nb oxides, Ta oxides and combinations thereof, is substituted at the B"-component position. The supplementary ingredient in combination with the main ingredient reacts as shown in the following reaction formula 2 upon calcination treatment.

That is to say, a bivalent oxide, which is an acceptor, is substituted at the B-component position (B') as in the reaction formula 2.

Such bivalent oxide acting as the acceptor is responsible for increasing resistance to reduction of specific resistivity due to trapping electrons generated upon firing under a reducing atmosphere.

Reaction Formula 2

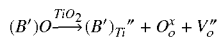

(wherein, (B')O: oxide of bivalent (B') ion, (B')Ti": (B') ion having efficient negative bivalent charges substituted at titanium lattice position of B-position, $O_o^x$: oxygen ion having no efficient charge present in oxygen lattice position, $V_o$: oxygen vacant position having efficient positive bivalent charges).

Further, a trivalent oxide and a pentavalent oxide are substituted at the A-component position and the B-component position (B") as donors, as represented by the following reaction formulas 3 and 4, respectively.

Such trivalent- and pentavalent-oxides, acting as the donors, play a principal role in decreasing migration of oxygen vacancy and increasing reliability.

Reaction Formula 3

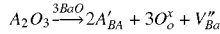

(wherein, $A_{Ba}$, A ion having efficient positive monovalent charge substituted at barium lattice position of A-component position, $O_o^x$: oxygen ion having no efficient charge present in oxygen lattice position, $V_{Ba}$": barium vacant position having efficient negative bivalent charges).

Reaction Formula 4

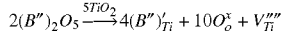

(wherein, (B")$_2$O$_5$: oxide of pentavalent (B") ion, (B")$'_{Ti}$: (B") ion having efficient positive monovalent charge substituted at titanium lattice position of B-component position, $Q_o^x$: oxygen ion having no efficient charge present in oxygen lattice position, $V_{Ti}$"": titanium vacant position having efficient negative tetravalent charges).

As can be seen in the above reaction formulas 3 and 4, in the case of adding the same amount of donors, when the supplementary ingredient (additive) substituted at the B-component position (B") is used, electrostatic energy is supplemented, released by electrovalence difference with a positive ion acting as an acceptor corresponding to a Ti ion as a master material, whereby substitution can be more easily performed and also stabilization of the total system can be achieved, compared to when the supplementary ingredient substituted only at the A-component position is used.

The processes of drying, calcining and pulverizing are not particularly limited in the present invention and any one performed in the art can be used.

Particularly, the drying process can be carried out when the main and the supplementary ingredients are mixed by a wet type method.

In other words, such drying process need not be conducted when the main and the supplementary ingredients are mixed by a dry type method.

The calcined dielectric component powders are preferably pulverized to have a final particle size of 0.5±0.1 μm through a dry- or a wet-type pulverizing method.

However, large quantities of non-pulverized ingredients remaining after a pulverizing process cause nonuniform particle size distribution after being fired, and adversely affect the properties of the multi-layer ceramic capacitor, for example, unfixed electrical properties and decrease of dielectric properties in fired materials. Thus, the process should be controlled to suppress production of such non-pulverized ingredients.

The dielectric component can be formed in a single phase by simultaneously mixing, (drying), and calcining the total of the main and the supplementary ingredients, or by mixing and calcining the parts of the main and the supplementary ingredients and then further mixing and calcining the others.

In order to form uniform dielectric composition having non-segregated supplementary ingredients, the dielectric component is added with the sintering aid as represented by the following chemical formula 2:

$$zLi_2O\text{-}2(1\text{-}z)SiO_2 (0 \leq z \leq 0.9). \quad \text{Chemical Formula 2}$$

In the above formula 2, the preferable z value ranges from 0.002 to 0.9.

The sintering aid is obtained by thermally treating (calcining or melting) a mixture consisting mainly of Li$_2$O powders and SiO$_2$ powders and pulverizing the treated mixture. The sintering aid-preparation method is not particularly limited in the present invention, and any one commonly performed in the art can be used. Such sintering aid is added to the calcined dielectric component. That is to say, the sintering aid is separately prepared, regardless of a formation process of the dielectric component, and then added to the calcined dielectric component so as to decrease the firing temperature of the dielectric composition. If the added amount is too small, addition effect is low. On the other hand, if the amount is too large, the firing temperature can be lowered but electrical properties are deteriorated. So, it is preferred that such the amount of the sintering aid falls within the range of 0.1–1.0 wt %, based upon the weight of the dielectric component.

As the sintering aid, a glass composition powder or a glass phase subjected to thermal treatment at 400–1300° C. can be used.

The glass composition is synthesized by calcining the glass frit at a temperature lower than the melting point of each constituent component in the glass frit, while the glass phase is made by melting the glass frit at a temperature higher than the melting point of each such component.

When the particle size of the glass component, serving as the sintering aid, is too large, microstructure of the dielectric composition becomes nonhomogeneous and also a thin film in the multiplayer ceramic capacitor cannot be prepared. Hence, the glass component is pulverized to the size of preferably 1 μm or smaller, and more preferably 0.5 μm or smaller, and then added to the dielectric component.

As mentioned above, the sintering aid is added to the dielectric component and then fired, thereby yielding the inventive dielectric composition.

It is preferred that the temperature of the firing process is set to 1000–1200° C.

Such firing process is not particularly limited in the present invention and any one conducted in the art can be used.

In the present invention, the main ingredient is concurrently calcined, along with the supplementary ingredient, to synthesize the dielectric component in a single phase, whereby substitution of the supplementary ingredient for the main ingredient and dispersion in a batch process can be easily carried out in the dielectric composition.

Concurrent addition of the donor to both of the A-position and B-position (B") leads to maximization of substitution effect in the ingredients, thus obtaining a homogeneous dielectric composition. Further, because of decreased local composition nonhomogeneity, capacity dispersion caused by nonhomogeneity of the microstructure in the fired material can be restrained, thus improving specific resistivity.

The dielectric composition of the present invention, firable at low temperatures, can be fired at about 1050–1150° C., 100–200° C. lower than conventional sintering temperatures, upon application to products.

Thereby, a problem of electrode break is solved, fabricating the multi-layer ceramic capacitor with high reliability.

Further, the inventive dielectric composition has a fine microstructure and also a small crystal size of 2–3 $\mu$m, thus being applicable to a superthin type multi-layer ceramic capacitor.

Having generally described this invention, a further understanding can be obtained by reference to certain specific examples which are provided herein for purposes of illustration only and are not intended to be limiting unless otherwise specified.

EXAMPLE 1

Barium carbonate, calcium carbonate, zirconium, titanium oxide, yttrium, vanadium and manganese dioxide powders were mixed well, dried, and thermally treated in an electric furnace at 1050° C. for 4 hours to calcine both of a main ingredient powder and a supplementary ingredient powder at the same time, yielding a dielectric component as represented by $(Ba_{1-x-y}Ca_xY_y)_m(Ti_{1-a-b-c}Zr_aMn_bV_c)O_{3+m}$ (hereinafter, referred to as 'BCYTZMV').

In the BCYTZMV dielectric component, (x) as a molar fraction of Ca, (y) as a molar fraction of Y, (a) as a molar fraction of Zr, (b) as a molar fraction of Mn and (c) as a molar fraction of v are shown in the following Table 1.

In Table 1, the dielectric component of No. 5 was prepared by previously calcining barium carbonate, calcium carbonate, zirconium and titanium oxide, which are the main ingredients, and mixing with the supplementary ingredient.

As such, the calcined BCYTZMV powders had an average particle size of 0.6 $\mu$m (measured with a particle size analyzer) and were quantitatively analyzed using a fluorescent X-ray analyzer (XRF), to obtain A/B ratio (m value) of 1.004.

As for No. 3 dielectric component of the following Table 1, the calcined BCYTZMV powder was analyzed with XRD and observed by a scanning electron microscope. The results are shown in FIGS. 2 and 3.

Figure 2:
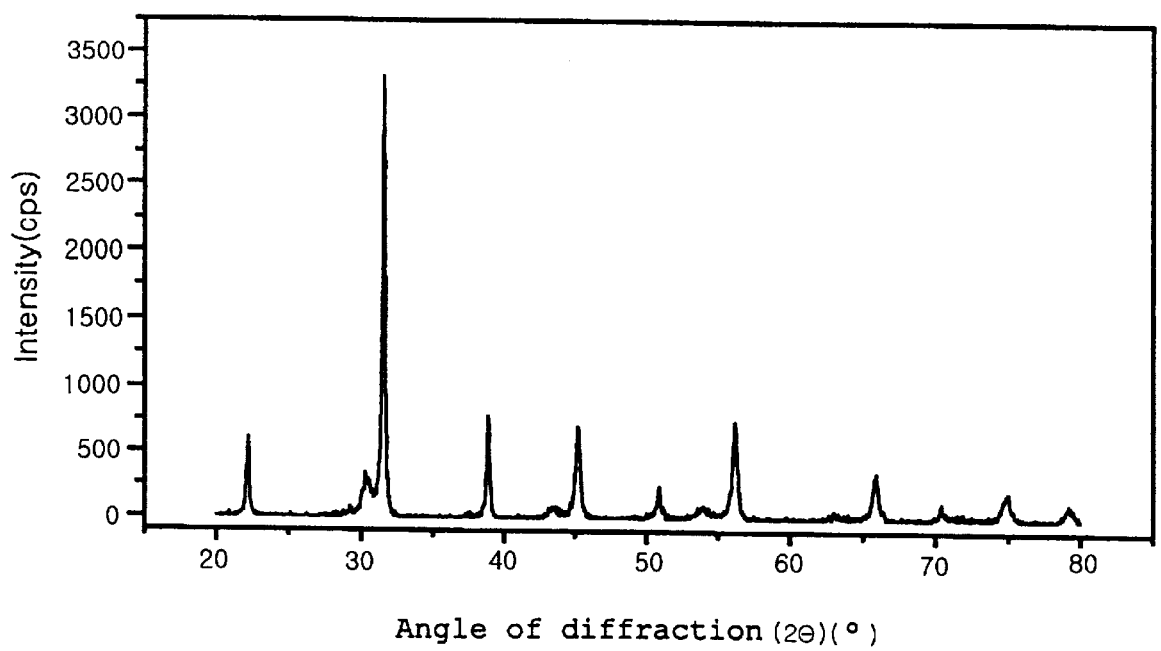
FIG. 2 shows an XRD analytical result of a dielectric composition prepared by a method of the present invention.
Figure 3:
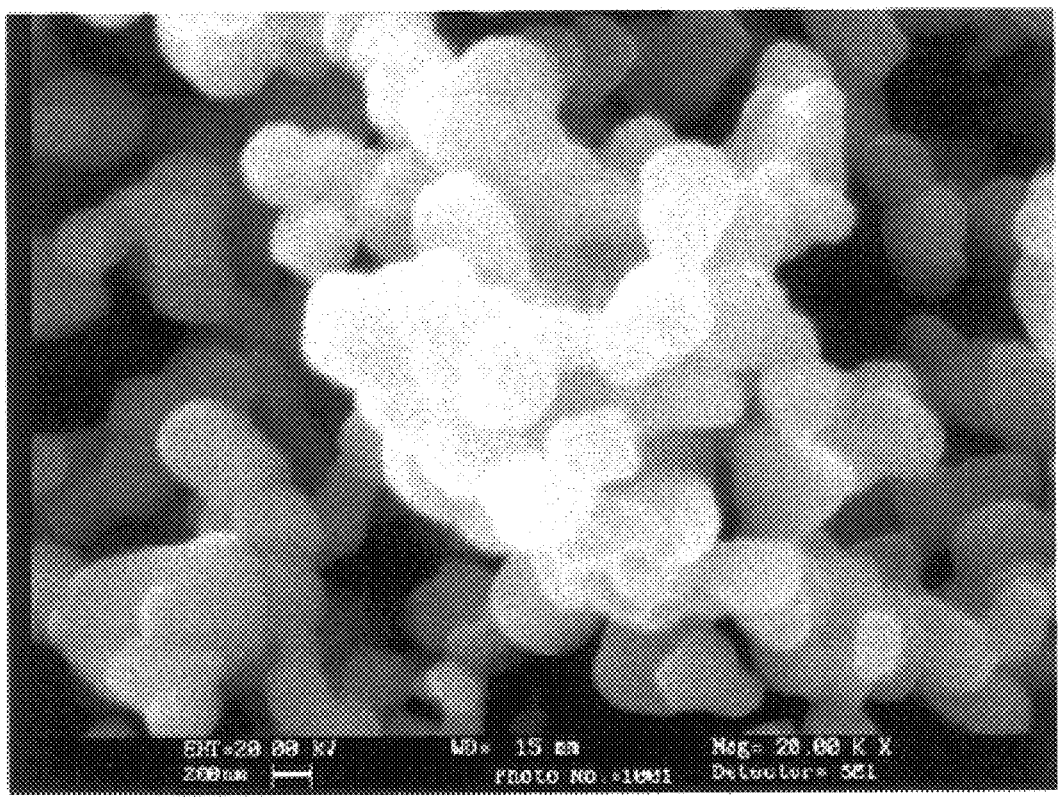
FIG. 3 shows a scanning electron microscopic photograph of a dielectric composition prepared by a method of the present invention.

As can be seen in FIG. 2, the powder after calcination has little non-reactive product. The scanning electron microscopic photograph of FIG. 3 shows a particle size similar to the result of particle size analysis (particle size: 0.6 $\mu$m).

Such calcined BCYTZMV dielectric component was added with a glass component as a sintering aid, to prepare a specimen. As the glass component, glass composition (LS) of $zLi_2O\text{-}2(1\text{-}z)SiO_2$ (z:0.5mol) was pulverized to the size of 0.5 $\mu$m or smaller using a ball media pulverizer, and used in the amount of 0.2 wt % based on 100 wt % of BCYTZMV.

As for the sintering aid (LS) in the following Table 1, the synthetic phase was obtained by thermally treating a two-component system of Li and Si at 900° C., a temperature lower than the melting point of either constituent component, while the glass phase was obtained by thermally treating such system at the temperature higher than the melting point.

The specimen was prepared according to a method known to K2.

That is to say, the film being 25 $\mu$m thick was formed by the doctor blade method, a plurality of film pieces cut to 15×15 cm were laminated to a total thickness of 1 mm, compressed under a pressure of 1200 kgf/cm$^2$ using a cold isostatic pressure (CIP) for 15 minutes, and cut to the size of 1.3×1.0 cm.

Such specimen was fired under a reducing atmosphere at 1100–1200° C. and measured for electrical properties at room temperature. The results are given in Table 1, below.

TABLE 1

| Specim. No. | Dielectric Component (BCYTZMV) | | | | | Sintering Aid (LS) | | Dielectric Constant | DF (%) | Specific Resistiv. (×10$^{13}$ Ω) | Partic. Size ($\mu$m) |
|---|---|---|---|---|---|---|---|---|---|---|---|
| | x | y | a | b | c | z | State | | | | |
| 1 | 0.005 | 0.0053 | 0.175 | 0.0041 | 0.001 | 0.5 | Syn. Phase | 15800 | 0.34 | 3.5 | 3.0 |
| 2 | 0.005 | 0.0058 | 0.175 | 0.0047 | 0.001 | 0.5 | Syn. Phase | 14700 | 0.30 | 3.0 | 2.8 |
| 3 | 0.005 | 0.0063 | 0.175 | 0.0054 | 0.001 | 0.5 | Syn. Phase | 14200 | 0.27 | 4.0 | 2.3 |
| 4 | 0.005 | 0.0063 | 0.175 | 0.0054 | 0.001 | 0.5 | Glass Phase | 15000 | 0.37 | 2.1 | 3.4 |
| 5 | 0.005 | 0.0063 | 0.175 | 0.0054 | 0.001 | 0.5 | Syn. Phase | 13500 | 0.44 | 0.7 | 3.0 |

From the above table, it can be seen that, as the amount of the added supplementary ingredient is increased, the dielectric constant is reduced, with decrease of particle size, but dielectric loss and specific resistivity are improved. Meanwhile, when the supplementary ingredients are added in the same amount, the results are different according to the state of glass composition. Upon use of the glass phase being low in melting point, a liquid phase is readily formed during firing, thus obtaining high dielectric constant with promotion of particle growth.

Hence, it is preferred that the glass phase type glass composition is used to obtain high dielectric constant, while the glass composition of the synthetic phase is used to yield high dielectric constant per unit particle size.

EXAMPLE 2

Each dielectric composition shown in the following Table 2 was prepared in the same manner as in the above example 1, and measured for electrical properties at room temperature. The results are presented in Table 2, below.

TABLE 2

| Specim. No. | $(Ba_{1-x-y}Ca_xA_y)_m$ $(Ti_{1-a-b-c}Zr_aB'_bB''_c)O_{m+3}$ | | | | | Sintering Aid (LS) | | Dielectric Constant | DF (%) | Specific Resistiv. $(\times 10^{13}\ \Omega)$ | A | B' | B'' |
|---|---|---|---|---|---|---|---|---|---|---|---|---|---|
| | x | y | a | b | C | z | State | | | | | | |
| 6 | 0.05 | 0.0064 | 0.175 | 0.0054 | 0.003 | 0.5 | Syn. Phase | 13846 | 0.498 | 22.26 | Dy | Mn | V |
| 7 | 0.05 | 0.0066 | 0.175 | 0.0054 | 0.002 | 0.5 | Syn. Phase | 13474 | 0.535 | 12.59 | Er | Mn | V |
| 8 | 0.05 | 0.0060 | 0.175 | 0.0054 | 0.002 | 0.5 | Syn. Phase | 15232 | 0.478 | 7.595 | Hf | Mn | V |
| 9 | 0.05 | 0.0070 | 0.175 | 0.0054 | 0.003 | 0.5 | Syn. Phase | 13724 | 0.471 | 4.147 | Ho | Mn | V |
| 10 | 0.05 | 0.0050 | 0.175 | 0.0054 | 0.001 | 0.5 | Syn. Phase | 13311 | 0.763 | 0.333 | La | Mn | V |
| 11 | 0.05 | 0.0064 | 0.175 | 0.0054 | 0.001 | 0.5 | Syn. Phase | 14082 | 0.437 | 0.756 | Y | Co | V |
| 12 | 0.05 | 0.0064 | 0.175 | 0.0054 | 0.001 | 0.5 | Syn. Phase | 13586 | 0.490 | 0.854 | Y | Ni | V |
| 13 | 0.05 | 0.0066 | 0.175 | 0.0054 | 0.002 | 0.5 | Syn. Phase | 15689 | 0.463 | 4.518 | Y | Mn | Nb |
| 14 | 0.05 | 0.0066 | 0.175 | 0.0054 | 0.002 | 0.5 | Syn. Phase | 15100 | 0.615 | 9.252 | Y | Mn | Ta |
| 15 | 0.05 | 0.0060 | 0.175 | 0.0054 | 0.005 | 0.5 | Syn. Phase | 16083 | 0.588 | 10.54 | Dy | Mn | Nb |
| 16 | 0.05 | 0.0060 | 0.175 | 0.0054 | 0.005 | 0.5 | Syn. Phase | 16127 | 0.603 | 18.19 | Dy | Mn | Ta |

As can be seen in the above table, when the supplementary ingredients are substituted at the A-, the B'- and the B''-component positions, excellent dielectric properties can be obtained.

As described above, the present invention can provide a homogeneous dielectric composition which is easily dispersed at a batch process, by calcining both of the main ingredient and the supplementary ingredient at the same time to synthesize the dielectric component. Therefore, local nonhomogeneities can be decreased and thus capacity dispersion according to nonhomogeneous microstructure in the fired material can be suppressed, thus increasing specific resistivity.

Further, the dielectric composition of the present invention can be fired at temperatures, 100–200° C. lower than conventional sintering temperatures, and has fine microstructure as well as small crystal particle size, thereby being applicable to a superthin type multi-layer ceramic capacitor. In addition, such dielectric composition can be simultaneously fired with Ni electrodes at low temperatures, and thus a frequency of electrode break is reduced, and can be used in preparation of a superthin type MLCC (multi-layer ceramic capacitor), exhibiting excellent reliability, dielectric loss and insulating properties.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A dielectric composition with increased homogeneity and insulation resistance, comprising a dielectric component represented by the following chemical formula 1 and a sintering aid represented by the following chemical formula 2:

$$(Ba_{1-x-y}Ca_xA_y)_m(Ti_{1-a-b-c}Zr_aB'_bB''_c)O_{3+m} \quad \text{Chemical Formula 1}$$

wherein $0.01 \leq x \leq 0.10$, $0.003 \leq y \leq 0.015$, $0.16 \leq a \leq 0.20$, $0.003 \leq b \leq 0.015$, $0 \leq c \leq 0.015$, $1.000 \leq m \leq 1.010$; the component A is selected from the group consisting of Y oxides, La oxides, Ho oxides, Dy oxides, Er oxides, Hf oxides and combinations thereof; the component B' is selected from the group consisting of Mn oxides, Co oxides, Ni oxides and combinations thereof; and the component B'' is selected from the group consisting of V oxides, Nb oxides, Ta oxides and combinations thereof;

$$zLi_2O\text{-}2(1-z)SiO_2 (0 \leq z \leq 0.9) \quad \text{Chemical Formula 2.}$$

2. The dielectric composition as set forth in claim 1, wherein the sintering aid is used in the amount of 0.1–1.0 wt %, based on the weight of the dielectric component.

3. The dielectric composition as set forth in claim 1 or 2, wherein the dielectric composition can be fired at 1000–1200° C.

4. A method of preparing a dielectric composition, comprising the steps of:

calcining a mixture of a main ingredient comprising barium-, calcium-, titanium- and zirconia-supplying compounds, and a supplementary ingredient, to prepare a dielectric component represented by the following chemical formula 1, said supplementary ingredient consisting of one member selected from among Y oxides, La oxides, Ho oxides, Dy oxides, Er oxides, Hf oxides and combinations thereof, another member selected from among Mn oxides, Co oxides, Ni oxides and combinations thereof and a further member selected from among V oxides, Nb oxides, Ta oxides and combinations thereof;

mixing the calcined dielectric component of the chemical formula 1 with a sintering aid represented by the following chemical formula 2; and firing the mixture of the dielectric component and the sintering aid:

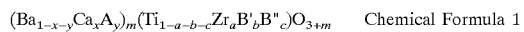  Chemical Formula 1 wherein $0.01 \leq x \leq 0.10$, $0.003 \leq y \leq 0.015$, $0.16 \leq a \leq 0.20$, $0.003 \leq b \leq 0.015$, $0 \leq c \leq 0.015$, $1.000 \leq m \leq 1.010$; the component A is selected from the group consisting of Y oxides, La oxides, Ho oxides, Dy oxides, Er oxides, Hf oxides and combinations thereof; the component B' is selected from the group consisting of Mn oxides, Co oxides, Ni oxides and combinations thereof; and the component B" is selected from the group consisting of V oxides, Nb oxides, Ta oxides and combinations thereof;

$$zLi_2O\text{-}2(1\text{-}z)SiO_2 (0 \leq z \leq 0.9) \qquad \text{Chemical Formula 2.}$$

5. The method as set forth in claim 4, wherein the sintering aid is used in the amount of 0.1–1.0 wt %, based on the weight of the dielectric component.

6. The method as set forth in claim 4 or 5, wherein the firing step is performed at 1000–1200° C.

7. The method as set forth in claim 4 or 5, wherein the sintering aid is pulverized to a size of 1 μm or smaller and then added to the calcined dielectric component.

8. The method as set forth in claim 6, wherein the sintering aid is pulverized to a size of 1 μm or smaller and then added to the calcined dielectric component.

9. A multi-layer ceramic capacitor comprising a ceramic layer consisting of a dielectric composition of any one of claims 1 to 3 and an internal electrode layer formed with nickel.

* * * * *